US012678966B2

(12) United States Patent
Balasubramanian et al.

(10) Patent No.: US 12,678,966 B2
(45) Date of Patent: Jul. 14, 2026

(54) ADAPTIVE REGION OF INTEREST (ROI) FOR VISION GUIDED ROBOTIC BIN PICKING

(71) Applicant: Siemens Aktiengesellschaft, Munich (DE)

(72) Inventors: Ajay Balasubramanian, Oakland, CA (US); Eugen Solowjow, Berkeley, CA (US); Ines Ugalde Diaz, Redwood City, CA (US); Chengtao Wen, Redwood City, CA (US)

(73) Assignee: Siemens Aktiengesellschaft, Munich (DE)

( * ) Notice: Subject to any disclaimer, the term of this patent is extended or adjusted under 35 U.S.C. 154(b) by 251 days.

(21) Appl. No.: 18/397,197

(22) Filed: Dec. 27, 2023

(65) Prior Publication Data

US 2024/0253234 A1 Aug. 1, 2024

(51) Int. Cl.
*B25J 9/16* (2006.01)

(52) U.S. Cl.
CPC ........... *B25J 9/1697* (2013.01); *B25J 9/1612* (2013.01)

(58) Field of Classification Search
USPC ................................................ 700/245–264
See application file for complete search history.

(56) References Cited

U.S. PATENT DOCUMENTS

| | | | | | |
|---|---|---|---|---|---|
| 7,313,464 | B1 * | 12/2007 | Perreault | ................ | B25J 9/1666 |
| | | | | | 700/262 |
| 11,203,116 | B2 * | 12/2021 | Demirdjian | .............. | B25J 9/163 |
| 11,772,833 | B1 * | 10/2023 | Shi | ............................ | B65B 5/08 |
| | | | | | 700/259 |
| 11,845,191 | B1 * | 12/2023 | Kuzhinjedathu | ..... | B23P 19/007 |
| 12,064,886 | B1 * | 8/2024 | Terhuja | .................. | B25J 9/1684 |
| 12,151,889 | B2 * | 11/2024 | Cohen | .................. | B65G 47/917 |
| 12,172,310 | B2 * | 12/2024 | Stoppi | ...................... | G06T 7/50 |
| 2014/0039679 | A1 * | 2/2014 | Ando | ..................... | B25J 9/1697 |
| | | | | | 901/47 |
| 2019/0291282 | A1 * | 9/2019 | Marchese | .............. | B25J 9/1669 |
| 2019/0355144 | A1 * | 11/2019 | Korobov | .................. | G06T 7/11 |
| 2020/0078941 | A1 * | 3/2020 | Oka | ...................... | B25J 9/1653 |
| 2020/0094414 | A1 * | 3/2020 | Xi | ......................... | G06V 30/224 |
| 2020/0156260 | A1 * | 5/2020 | Takasaki | .................. | B25J 9/142 |
| 2020/0238519 | A1 * | 7/2020 | Diankov | ................ | B25J 9/1697 |
| 2020/0311956 | A1 * | 10/2020 | Choi | ..................... | G06V 10/454 |
| 2020/0391385 | A1 * | 12/2020 | Oka | ...................... | B25J 9/1666 |

(Continued)

FOREIGN PATENT DOCUMENTS

| | | |
|---|---|---|
| EP | 2810747 A2 | 12/2014 |
| EP | 3718709 A1 | 10/2020 |

*Primary Examiner* — Jonathan L Sample

(57) ABSTRACT

An autonomous system can include a depth camera configured to capture a depth image of a bin that contains a plurality of objects from a first direction, so as to define a captured image. Based on the bottom end of the bin and the captured image, the system can generate a cropped region that defines a plane along a second direction and a third direction that are both substantially perpendicular to the first direction. Based on the captured image, the system can make a determination as to whether at least one object of the plurality of objects lies outside the cropped region. Based on the determination, the system can select a final region of interest for determining grasp points on the plurality of objects.

15 Claims, 6 Drawing Sheets

(56)     References Cited

U.S. PATENT DOCUMENTS

| | | | |
|---|---|---|---|
| 2021/0032030 A1* | 2/2021 | Kalouche | B25J 9/14 |
| 2021/0101286 A1* | 4/2021 | Lee | B25J 13/08 |
| 2021/0129333 A1* | 5/2021 | Kanunikov | B25J 9/1671 |
| 2021/0138655 A1* | 5/2021 | Mousavian | B25J 9/1666 |
| 2022/0016766 A1* | 1/2022 | Humayun | G06T 7/50 |
| 2022/0072712 A1* | 3/2022 | Tang | B25J 9/1697 |
| 2022/0388162 A1* | 12/2022 | Fan | G06N 3/09 |
| 2022/0391638 A1* | 12/2022 | Fan | G06F 18/214 |
| 2023/0158677 A1* | 5/2023 | Tsutsui | B65G 57/03 |
| | | | 700/246 |
| 2023/0169675 A1* | 6/2023 | Tang | G06T 7/12 |
| | | | 382/103 |
| 2024/0253234 A1* | 8/2024 | Balasubramanian | B25J 9/1697 |

* cited by examiner

ADAPTIVE REGION OF INTEREST (ROI) FOR VISION GUIDED ROBOTIC BIN PICKING

BACKGROUND

Autonomous operations, such as robotic grasping and manipulation, in unknown or dynamic environments present various technical challenges. Autonomous operations in dynamic environments may be applied to mass customization (e.g., high-mix, low-volume manufacturing), on-demand flexible manufacturing processes in smart factories, warehouse automation in smart stores, automated deliveries from distribution centers in smart logistics, and the like. In order to perform autonomous operations, such as grasping and manipulation, in some cases, robots may learn skills using machine learning, in particular deep neural networks or reinforcement learning. Additionally, or alternatively, autonomous systems might perform computer vision algorithms on color photographs or depth maps of a given bins with objects in random configurations, so as to compute grasping points on the objects within the bin.

In particular, for example, robots might interact with different objects under different situations. Some of the objects might be unknown to a given robot or in configurations or positions with respect to each other that are unknown to a given robot. Bin picking refers to a robot grasping objects that can define random or arbitrary poses, from a container or bin. The robot can move or transport the objects, and place them at different locations for packaging or further processing. In order to determine suitable grasp points on objects in random configurations within bins, systems often determine a region of interest (ROI). It is recognized herein, however, that current approaches to determining the ROI for robotic picking lack efficiency and capabilities. In particular, current approaches often do not properly or efficiently estimate grasp points on objects proximate to walls of a bin, due to various technical challenges in doing so, which can impact grasp computations and overall performance of a given robot.

BRIEF SUMMARY

Embodiments of the invention address and overcome one or more of the described-herein shortcomings or technical problems by providing methods, systems, and apparatuses for determining adaptive regions of interest. Such adaptive regions of interest can include objects proximate to, or against, bin wall, such that grasp points can be generated for such objects without interference from the bin walls.

In an example aspect, an autonomous system is configured to operate in an active industrial runtime so as to define a runtime. The autonomous system can include a depth camera configured to capture a depth image of a bin that contains a plurality of objects, so as to define a captured image. The autonomous system further includes a processor and a memory storing instructions that, when executed by the processor, cause the autonomous system to perform various operations. The bin can define a top end facing the camera and a bottom end opposite the top end along a first direction. The bin can also define a front end and a rear end opposite the front end along a second direction that is substantially perpendicular to the first direction. Further still, the bin can define a first side and a second side opposite the first side along a third direction that is substantially perpendicular to both the first and second directions. Based on the bottom end and the captured image, the system can generate a cropped region that defines a plane along the second and third directions. Based on the captured image, the system can make a determination as to whether at least one object of the plurality of objects lies outside the cropped region. Based on the determination, the system can select a final region of interest for determining grasp points on the plurality of objects.

In an example, the autonomous system further includes a robot defining an end effector configured to grasp the plurality of objects within the bin. Based on the final region of interest, the system can determine grasp points on the plurality of objects, and instruct the robot to grasp the plurality of objects at the respective grasp points. In various examples, the system can generate the cropped region based on an area defined by the bottom end in the captured imaged, such that the cropped region defines a perimeter within the area defined by the bottom end. Based on the perimeter, the system can determine a boundary that is within the perimeter, such that a first and second subregion are defined between the perimeter of the cropped region and the boundary along the second direction, and a third and fourth subregion are defined between the perimeter of the cropped region and the boundary along the longitudinal direction. Furthermore, the bottom end of the bin can define a bin bottom height along the first direction. Thus, based on the captured image, the system can determine a maximum height along the transverse direction defined by the subregions. The system can compare the maximum height of the subregions to the bin bottom height. In an example, the system determines that the maximum height of the subregions is substantially equal to the bin bottom height, and responsive to determining that the maximum height of the subregions is substantially equal to the bin bottom height, the system can use the cropped region as the final region of interest, such that the grasp points are determined based on the cropped region of interest. Alternatively, the system can determine that the maximum height of the subregions is greater than the bin bottom height, and responsive to determining that the maximum height of the subregions is greater than the bin bottom height, the system can expand the cropped region of interest along the second and third directions, so as to define an expanded region that includes at least a portion of the subregions.

In another example aspect, the top end of the bin can define a bin boundary along the second and third directions. The system can determine that the expanded region of interest fits within the bin boundary, such that the expanded region of interest defines an adaptive region of interest. Consequently, the system can use the adaptive region of interest as the final region of interest, such that the grasp points are determined based on the cropped region.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
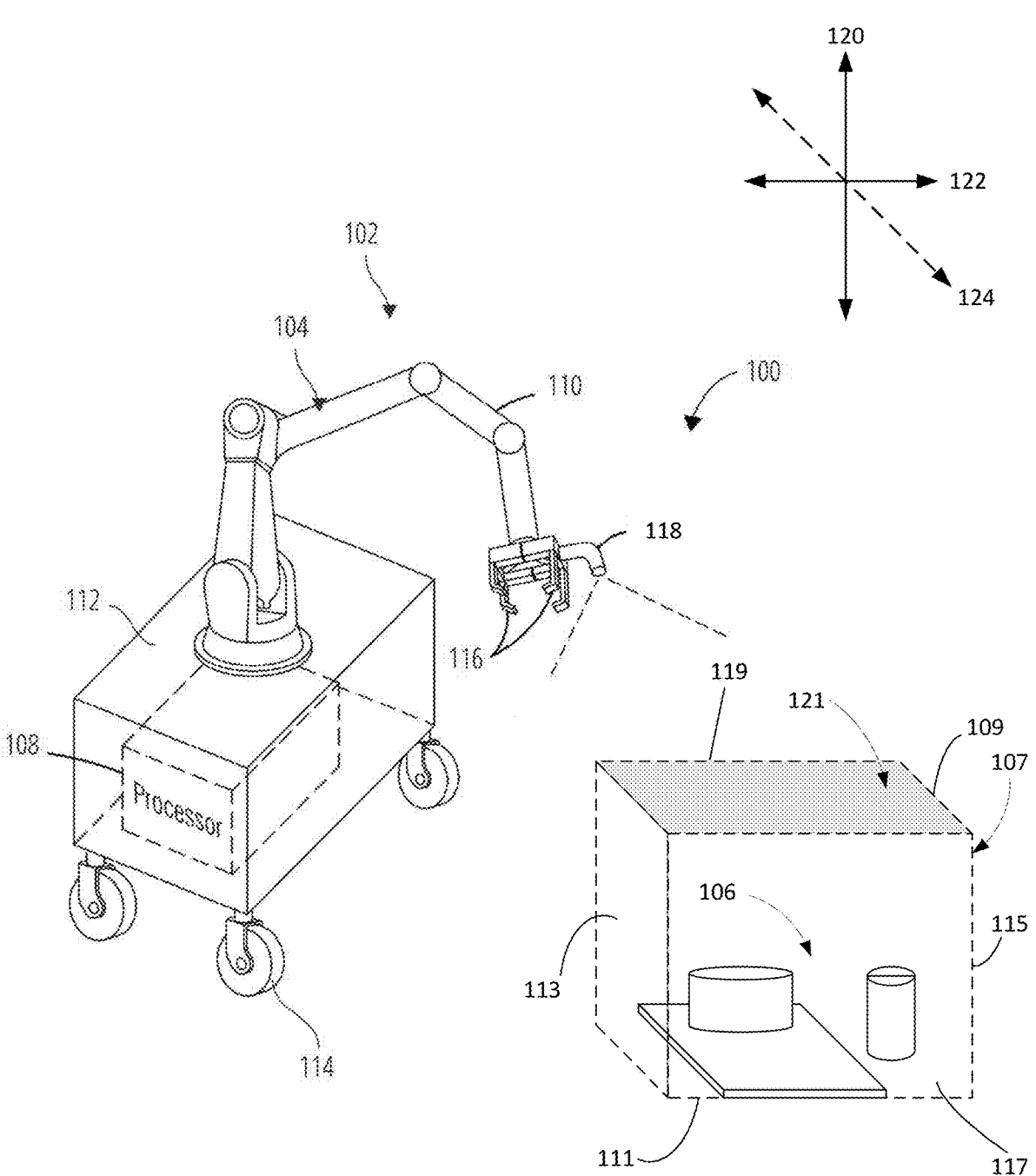
FIG. 1 shows an example autonomous system in an example physical environment that includes a bin capable of containing various objects, in accordance with an example embodiment.

As an initial matter, it is recognized herein that grasping algorithms can rely on computer vision systems to estimate suitable grasping points in arbitrary bin configurations, wherein any number of objects may appear in arbitrary random positions and the camera that captures an image of the objects may be located at arbitrary heights with respect to the bin. In various cases, a region of interest (ROI) is determined. A purpose of the ROI is to inscribe the grasp computation search in a region of the image, in particular, for example, the region of the image where the objects are present. It is further recognized herein that it is often important that the region excludes the bin walls because the bin walls often negatively impact the performance of computer vision systems. Further still, it is recognized herein that in exclude the bin walls in the ROI, objects, for instance objects against or proximate to the bin walls, can be excluded from the ROI, and thus excluded from grasp computations. To address these technical challenges, among others, in various embodiments a system generates an ROI that adaptively expands from a default ROI associated with a bin bottom, so as to define an expanded or adaptive ROI. The adaptive ROI can contain surfaces of objects that might be excluded from the default ROI. For example, the adaptive ROI can contain objects stacked against bin walls while excluding or minimizing the presence of empty bin wall regions, so as to include surfaces of all objects within the bin while excluding regions that can hamper bin picking performance. In various examples, as described herein, the system can expand the ROI only on specific sides where objects may be present. Additionally, in various examples, the system expands or adapts the default ROI based on a perspective defined by the corresponding camera.

It is further recognized herein that current approaches to robotic bin picking often lack efficiencies or capabilities with respect to recognizing and grasping objects proximate to bin walls. In an example approach, the entire work cell can be modeled in a simulation environment, such that each object, bin, and robot define respective collision geometries for performing holistic collision checking and collision avoidance. It is recognized herein, however, that such simulation environments are often difficult to engineer and maintain. Furthermore, such simulations are often too slow for runtime execution (affecting overall cycle time performance). In another example approach, point cloud information for an empty bin (e.g., no objects present) might be captured. At the beginning of every pick cycle, the point cloud information might be subtracted from the point cloud information captured before executing a picking instance. It is recognized herein, however, that such an approach relies on the assumption, among other shortcomings, that the bin will not move throughout the pick cycle, which is not realistic. In contrast, in accordance with embodiments described herein, collision checks can be performed efficiently (e.g., lightweight, fast speed) at runtime without affecting the cycle time performance.

Referring initially to FIG. 1, an example industrial or physical environment or workspace or scene 100 is shown. As used herein, a physical environment, workspace, or scene can refer to any unknown or dynamic industrial environment. Unless otherwise specified, physical environment, workspace, and scene can be used interchangeably herein, without limitation. For purposes of example, one or more objects 106 can be disposed in a bin or container, for instance a bin 107, so as to be positioned for grasping. Unless otherwise specified herein, bin, container, tray, box, or the like can be used interchangeably, without limitation. By way of example, objects 106 can be picked from the bin 107 by one or more robots, and transported or placed in another location, for instance outside the bin 107. It will be understood that the objects 106 can be alternatively shaped or define alternative structures as desired, and all such objects are contemplated as being within the scope of this disclosure.

The physical environment 100 can include a computerized autonomous system 102 configured to perform one or more manufacturing operations, such as assembly, transport, or the like. The autonomous system 102 can include one or more robot devices or autonomous machines, for instance an autonomous machine or robot device 104, configured to perform one or more industrial tasks, such as bin picking, grasping, or the like. The system 102 can include one or more computing processors configured to process information and control operations of the system 102, in particular the autonomous machine 104. The autonomous machine 104 can include one or more processors, for instance a processor 108, configured to process information and/or control various operations associated with the autonomous machine 104. An autonomous system for operating an autonomous machine within a physical environment can further include a memory for storing modules. The processors can further be configured to execute the modules so as to process information and generate models based on the information. It will be understood that the illustrated environment 100 and the system 102 are simplified for purposes of example. The environment 100 and the system 102 may vary as desired, and all such systems and environments are contemplated as being within the scope of this disclosure.

Still referring to FIG. 1, the autonomous machine 104 can further include a robotic arm or manipulator 110 and a base 112 configured to support the robotic manipulator 110. The base 112 can include wheels 114 or can otherwise be configured to move within the physical environment 100. The autonomous machine 104 can further include an end effector 116 attached to the robotic manipulator 110. The end effector 116 can include one or more tools configured to grasp and/or move objects 106. Example end effectors 116 include finger grippers or vacuum-based grippers. The robotic manipulator 110 can be configured to move so as to change the position of the end effector 116, for example, so as to place or move objects 106 within the physical environment 100. The system 102 can further include one or more cameras or sensors 118, for instance a depth camera or three-dimensional (3D) point cloud camera, configured to detect or record objects 106 within the physical environment 100. The camera 118 can be mounted to the robotic manipulator 110 or otherwise configured to generate a 3D point cloud of a given scene, for instance the physical environment 100. Alternatively, or additionally, the one or more cameras of the system 102 can include one or more standard two-dimensional (2D) cameras that can record or capture images (e.g., RGB images or depth images) from different viewpoints. Those images can be used to construct 3D images. For example, a 2D camera can be mounted to the robotic manipulator 110 so as to capture images from perspectives along a given trajectory defined by the manipulator 110.

Still referring to FIG. 1, the camera 118 can be configured as an RGB-D camera defining a color and depth channel configured to capture images of the bin 107, and thus the objects 106 within the bin 107, along a first or transverse direction 120. Thus, the camera 118 can define a depth camera configured to capture depth images of the workspace 100 from a perspective along the transverse direction 120. For example, the bin 107 can define a top 109 end and a bottom end 111 opposite the top end 109 along the transverse direction 120. The bin 107 can further define a first side 113 and a second side 115 opposite the first side 113 along a second or lateral direction 122 that is substantially perpendicular to the transverse direction 120. The bin 107 can further define a front end 117 and a rear end 119 opposite the front end 117 along a third or longitudinal direction 124 that is substantially perpendicular to both the transverse and lateral directions 120 and 122, respectively. Thus, the first side 113, second side 115, front end 117 and rear end 119 can define walls of the bin or container 107. Though the illustrated container 107 defines a rectangular shape, it will be understood that bins or containers can be alternatively shaped or sized, and all such bins or containers are contemplated as being within the scope of this disclosure. By way of example, the container 107 may be alternatively shaped so as to define fewer than, or greater than, four walls.

Figure 3:
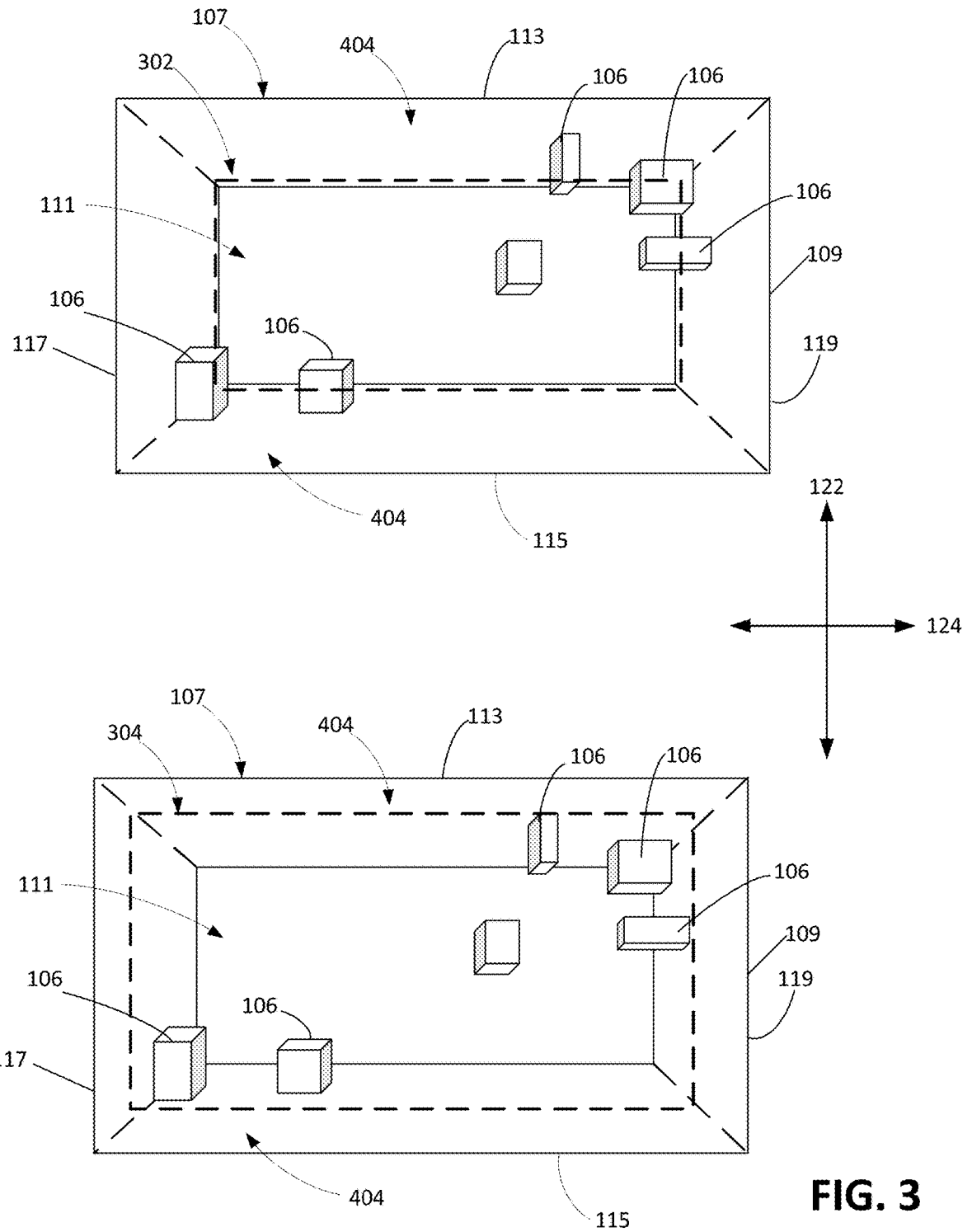
FIG. 3 illustrates an example default region of interest and an example adaptive region of interest according to an example embodiment, wherein the adaptive region of interest is configured to include objects at or near walls of the bin.

Referring to FIG. 3, an example default or bin bottom ROI 302 can include objects 106 that are spaced from the walls of the bin 107, but exclude the walls of the bin 107, such that any objects 106 that abut, or are proximate to, the walls of the bin 107 might be excluded from the default ROI 302. In contrast, an example adaptive ROI 304 can include objects 106 that abut, or are proximate to, the walls of the bin 107. In various examples, bins or containers can contain objects having different heights or shapes against bin walls, or can contain objects piled above the bin bottom against the bin walls, such that a given ROI does not include or capture the surfaces of the objects. Thus, in various examples, graspable surfaces of objects proximate to bin walls might be excluded or not sufficiently visible within a given ROI, such that grasp points on the objects cannot be identified.

Figure 4:
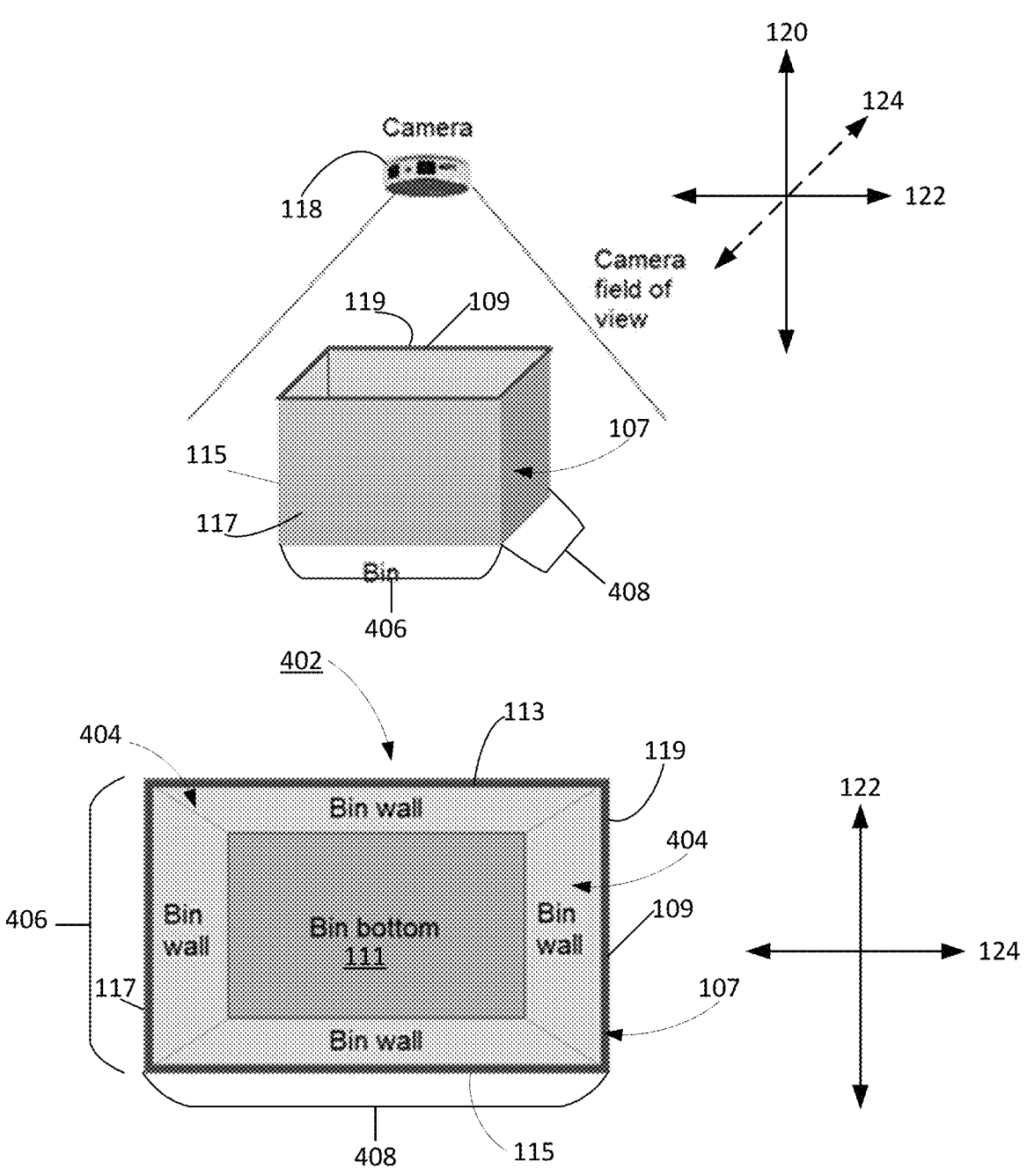
FIG. 4 illustrates a perspective illusion that can be generated by capturing an image of the bin of FIG. 1 from an overhead perspective, in accordance with an example embodiment.

Referring also to FIG. 4, the perspective illusion described in the above examples of objects against bin walls is further illustrated. An example overhead image 402 can be captured by the camera 118 that is positioned above the bin 107 along the transverse direction 120. The example overhead image 402 defines the perspective illusion, in which the bin 107 appears to define a bin wall surface area 404 along the lateral and longitudinal directions 122 and 124, respectively. Thus, even though the bin 107 defines a fixed width 406 along the lateral direction 122 and a fixed length 408 along the longitudinal direction 124, because of the perspective illusion generated by the position of the camera 118 (and its resulting field of view) as compared to the bin 107, the captured image 402 illustrates the bottom end 111 as including the bin wall surface area 404, such that the image 402 defines a width of the bottom end 111 along the lateral direction 122 that is less than the fixed width 406, and such that the image 402 defines a length of the bottom end 111 along the longitudinal direction 124 that is less than the fixed length 408. Stated another way, although the bin 107 can define fixed dimensions, for instance a fixed width 406 and a fixed length 408 at both the top end 109 of the bin walls and the bottom end 111 of the bin walls, because of the perspective of the camera 118, the dimensions at the top end 111 can appear larger than the dimensions at the bottom end 109. It will be understood that the camera 118 can be alternatively positioned relative to the bin 107, such that the perspective illusion can define alternatively shaped or sized bin wall surface areas 404, and all such positions and perspective illusions are contemplated as being within the scope of this disclosure. Similarly, the bin 107 can be alternatively shaped, for instance the walls can define an angle of greater than or less than 90 degrees relative to the bottom end 111, such that the bin wall surface areas 404 depicted in the overhead image can be alternatively sized or shaped, and all such bin configurations and resulting bin wall surface areas are contemplated as being within the scope of this disclosure.

Thus, when the overhead image 402 includes objects that appear on the bin wall surface area 404, such objects can be excluded from the default ROI that might only include the bottom end 111 from the image 402. Furthermore, in some cases, as the bin 107 contains more objects, the objects can pile up and climb on the bin walls, such that more objects might appear on the bin wall surface area 404, rendering the ROI at the bottom end 111 of the bin 107 increasingly insufficient to capture the objects. That is, tall objects or objects defining grasp surfaces proximate to the camera 118 along the transverse direction 120 can be excluded from a given ROI. Consequently, graspable surfaces might be hardly visible in the ROI, and/or some objects can be entirely excluded the ROI. In many cases, such as, for example, when a system performs vision guided robotic bin picking to recognize objects in mixed bins, the system might require a full view of the objects in the bin. In such examples, among others, if a given object lies outside of the fixed ROI, the system might not be able to locate the object and grasp the object.

Thus, in accordance with various embodiments, an ROI is generated that adaptively expands from a default ROI, for instance a default ROI at the bottom end 111 of the bin 107, so as to define an adaptive ROI that contains or includes surfaces of all objects, for instance objects stacked against bin walls. Additionally, in various examples, the adaptive ROI can be generated so as to minimize the presence of empty bin all regions (e.g., areas in which the respective bin wall surface area 404 contains no objects). It is recognized herein that such empty bin wall regions can present artifacts that hamper grasping and picking performance. Thus, in various embodiments, a given adaptive ROI might only expand from the default ROI on sides where objects may be present. Furthermore, the adaptive ROI can be generated based on the perspective of the camera that captured the corresponding image, such that the perspective of the camera is considered when the determining the expansion of a given ROI.

Figure 2:
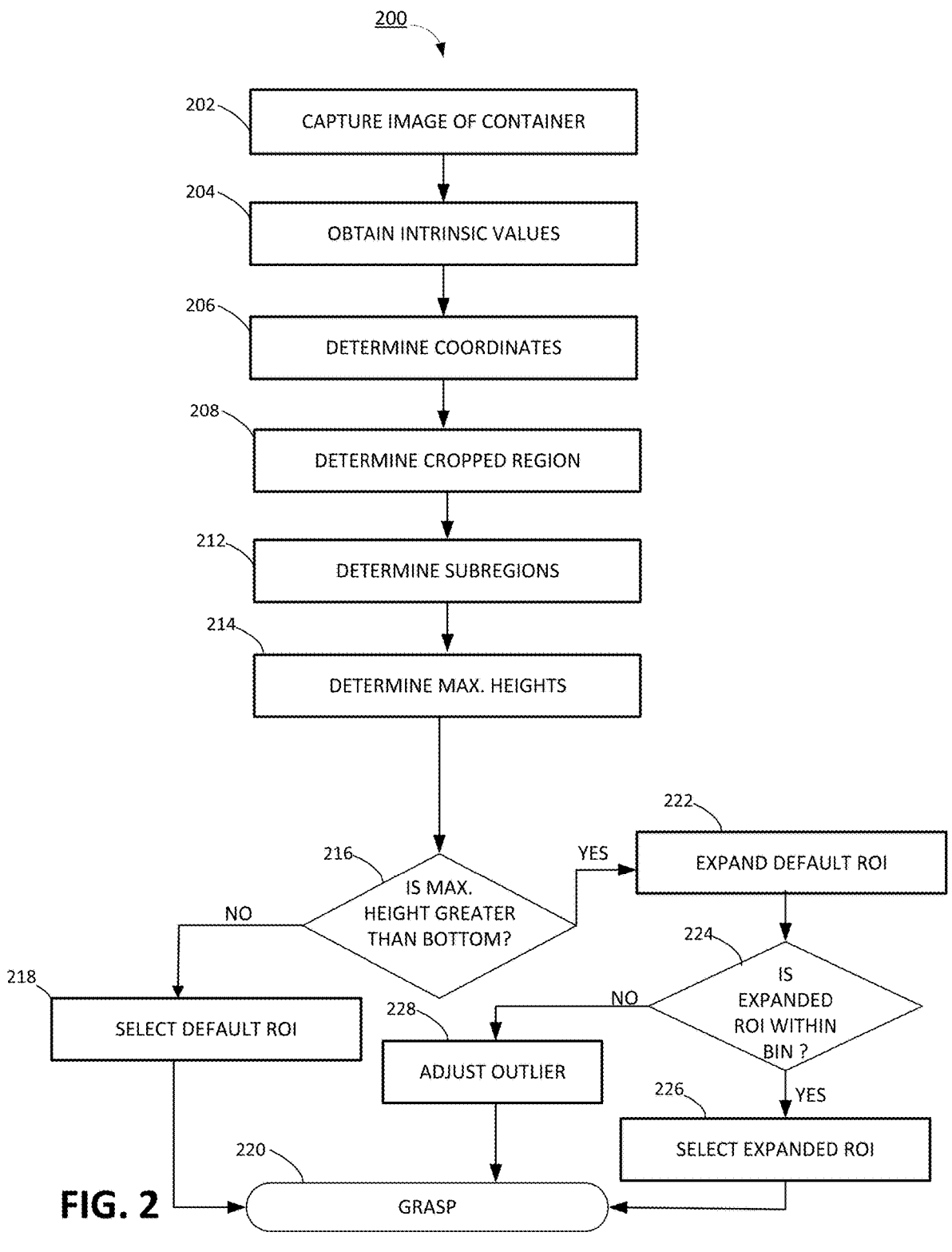
FIG. 2 is a flow diagram that illustrates example operations that can be performed by the autonomous system, so as to determine grasp points on objects near or against walls of the bin, in accordance with an example embodiment.

Referring now to FIG. 2, example operations 200 are shown that can be performed by a computing system, for instance the autonomous system 102. At 202, the system 102, for instance the camera 118, can capture an image of the bin 107 and the objects 106 disposed within the bin 107, so as to define a captured depth image. The captured image can define RGB (color) or RGB-D information (color and depth information) corresponding to the bin 107 and the objects 106 within the bin. In some examples, the color and depth images can include the bin 107 in a vertically aligned (unrotated) position. Alternatively, in some cases, the bin 107 is in a rotated position in the captured image. In such cases, the system 102 can detect an angle of rotation defined by the bin 107 in the captured image. After detecting the angle of rotation, the system 102 can rotate the captured image so as to vertically align the bin 107. To vertically align the bin 107, in an example, a side of the bin 107 is parallel to the x-axis of the captured image (e.g., longitudinal direction 124 in FIGS. 3-5B) and one side is parallel the y-axis of the captured image (e.g., lateral direction 122 in FIGS. 3-5B). When a given bin is not vertically aligned, none of its sides are parallel to any of the axes of the captured image. The angle of rotation of a rotated bin (non-vertically aligned) is the amount of rotation the bin has been rotated about its center point. For an unrotated/vertically aligned bin, this angle is zero. As an example, for a bin that is exactly 30 degrees rotated (in anti-clockwise, because positive angles are anti-clockwise and negative angles are clockwise) about its center, one of its sides will be +30 degrees with respect to the x-axis of the captured image.

At 204, the system 102 can obtain intrinsic values associated with the camera 118 that captured the image of the bin 107. The intrinsic values of the camera 118 can include, by way of example and without limitation, focal length along the lateral and longitudinal directions 122 and 124, respectively (x and y directions), a distance along the transverse direction 120 between the camera 118 and the bottom end 111 of the bin 107, and the principal axis defined by the camera 118. The principal axis can define a line along the transverse direction 120 from the center of the camera 118 to a plane defined by the captured image along the lateral and longitudinal directions 122 and 124, respectively. The captured image can include depth image pixel values that indicate a distance along the transverse direction between the camera 118 and each point (pixel) in the captured image. In various examples, the intrinsic values of the camera can be used to transform points in the two-dimensional (2D) captured image frame to respective points in a three-dimensional (3D) camera frame. At 206, the system 102 can obtain or determine coordinates associated with the bottom end 111 of the bin. In particular, for example, the coordinates can indicate locations in a plane defined by the lateral and longitudinal directions 122 and 124 that define corners of the bottom end 111. In some cases, the coordinates can define opposite corners of the bottom end 111, for instance the corner defined by the front end 117 and the first side 113 (e.g., top left in FIGS. 3-5B) and the corner defined by the rear end 119 and the second side 115 (e.g., bottom left in FIGS. 3-5B) of the bottom end 111. In some examples, the system 102 can perform vision-based bin detection operations to determine the coordinates of the bottom end 111. The operations can include drawing a bounding box or contour around the bottom end 111 of the bin 107. By way of example, and without being bound by theory, the coordinates associated with the bottom end 111 might have inaccuracies up to 5 mm in the 3D camera frame and still generate a reliable adaptive ROI output.

With continuing reference to FIG. 2, based on the captured depth image, the intrinsic values associated with the camera, and the coordinates associated with the bottom end 111, the system 102 can determine a cropped region in the depth image, for instance in the example overhead image

402. By way of example, referring to FIGS. 5A and 5B, an example cropped region 502 can include an area up to the area defined by the default ROI 302. In particular, for example, the cropped region 502 can include the bottom end 111 except for a predetermined portion of the rectangle defined by the bottom end 111. The predetermined portion of the default ROI 302 or bottom end 111 that is excluded from the cropped region 502 can be based on the accuracy of the coordinates of the bottom end 111. In various examples, the more inaccurate the coordinates of the bottom end 111, the more area of each side of the rectangle defined by the bottom end 111 is excluded from the cropped region 502. By way of further example, if the coordinates of the bottom end 111 are substantially equal to the actual corner points defined by the bottom end 111, the cropped region 502 is substantially equal to region defined of the bottom end 111, for instance the default ROI 302. In various examples, the bin coordinates are determined at 206. For example, the system 102 can perform computer vision detection operations on the captured image to detect the rectangular contour of the outermost portion of the bin defined by the top end 109. Based on the rectangular contour, the corner coordinates can be determined. In an example, the corner coordinates are decreased by the height of the bin, as identified from the values intrinsic to the camera 118, so as to determine the coordinates defined by the bottom end 111. In various examples, the accuracy of the detected bin coordinates can depend on, for example and without limitation, camera depth image quality, accuracy of camera intrinsic values, and accuracy of camera calibration. Thus, in some cases, the accuracy of bin detection coordinates are verified in a qualitative manner by a user. Such verification might only be performed once for a given set-up. Furthermore, in some examples, the system 102 can display the contours of detected bins in real-time, thus a user can easily see if the contour matches the boundary of the real bin. By way of example, if they are exact, then bin detection is accurate, and if the intrinsic values and calibration are also accurate, the bin bottom coordinates are accurate. In an example, up to 5 mm inaccuracy in bin bottom coordinates is tolerated.

Thus, the system 102 can select the cropped region 502 so as to exclude any bin wall surface area 404 or regions of the bin sides from the cropped region 502, and thus from subsequent processing in generating an adaptive ROI. It is recognized herein that the sides of the bin 107 define non-zero depth values, so excluding the bin wall surface area 404 can from the cropped region 502 can ensure that the operations of determining the adaptive ROI are not burdened by such non-zero depth values when minimum depth values are determined, as further described herein. Furthermore, it is also recognized herein that a given bin might define protrusions on its sides, and excluding the bin wall surface area 404 excludes such protrusions from affecting adaptive ROI operations further described herein.

Figures 5A, 5B:
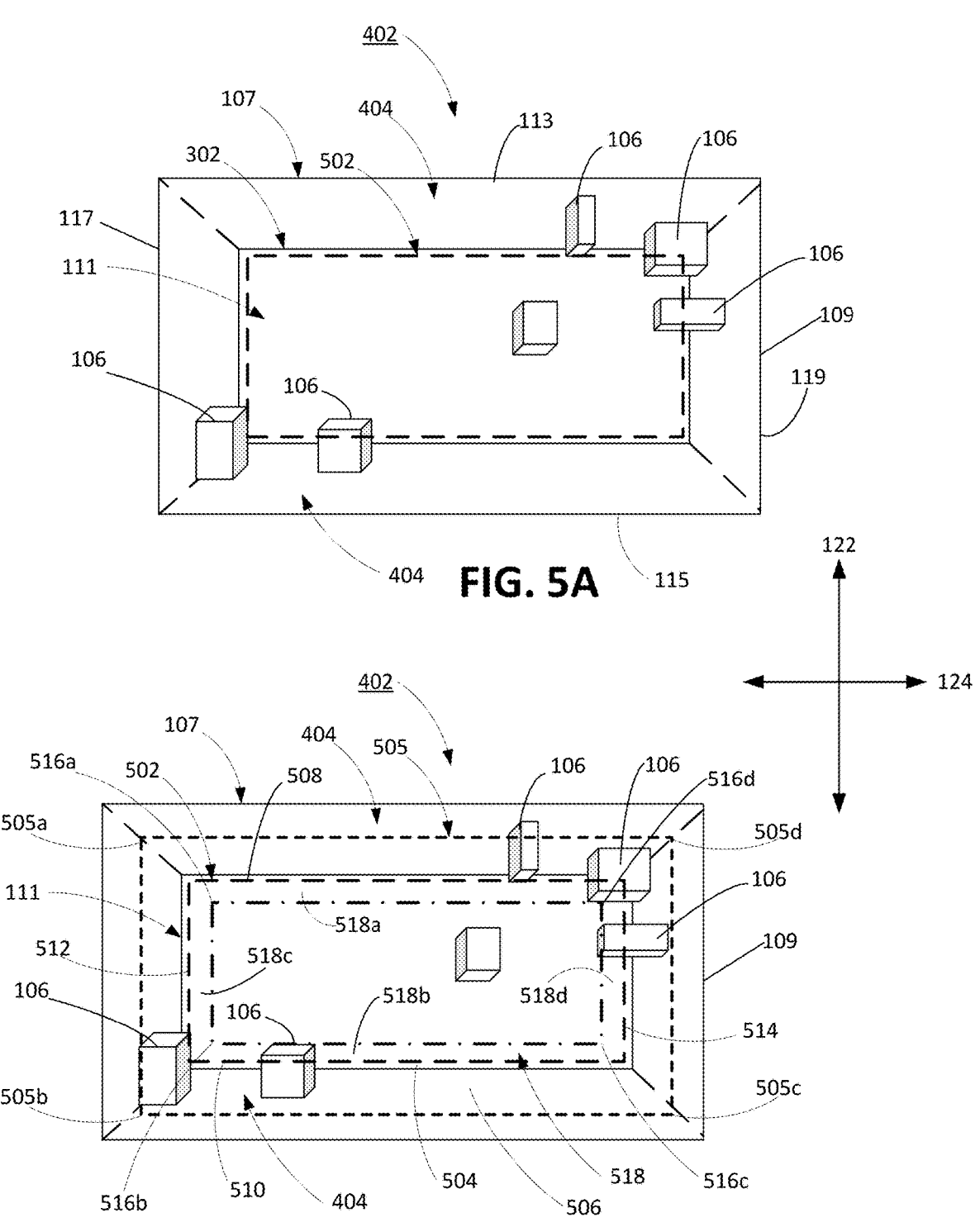
FIGS. 5A and 5B illustrate an example of how the region of interest can be adapted so as to address the perspective illusion exemplified in FIG. 4, in accordance with an example embodiment.

With particular reference to FIGS. 2 and 5B, based on the cropped region 502, the system 102 can determine a boundary 506 within the cropped region 502, at 212. In an example, the boundary 506 defines a rectangle within the cropped region 502, though it will be understood that the boundary 506 can be alternatively sized or shaped within a given cropped region, and all such boundaries are contemplated as being within the scope of this disclosure. By way of example, the cropped region 502 defines a perimeter 504, and the boundary 506 is disposed within the perimeter 504. In particular, for example, the perimeter 504 of the cropped region 502 can define a first side 508 and a second side 510 opposite the first side 508 along the lateral direction 122, and can further define a third side 512 and a fourth side 514 opposite the third side 512 along the longitudinal direction 124. Thus, the cropped region 502, in particular the perimeter 504 of the cropped region 502, can define a width from the first side 508 to the second side 510 along the lateral direction 122, and a length from the third side 512 to the fourth side 514 along the longitudinal direction 124. In various examples, the system 102 generates the boundary 506 based on the width and length defined by the cropped region 502.

In particular, for example, at 212, the system 102 can determine corner points, for instance corner points 516a-d that define corners of the boundary 506, based on the width and length of the cropped region 502. By way of example, a first corner point 516a can be disposed at the location defined at the intersection of 10% of the width of the cropped region 502 measured from the first side 508 toward the second side 510 along the lateral direction 122, and 10% of the length of the cropped region 506 measured from the third side 512 toward the fourth side 514 along the longitudinal direction 124. A second corner point 516b can be disposed at the location defined at the intersection of 10% of the width of the cropped region 506 measured from the second side 510 toward the first side 508 along the lateral direction 122, and 10% of the length of the cropped region 502 measured from the third side 512 toward the fourth side 514 along the longitudinal direction 124. A third corner point 516c can be disposed at the location defined at the intersection of 10% of the width of the cropped region 502 measured from the second side 510 toward the first side 508 along the lateral direction 122, and 10% of the length of the cropped region 506 measured from the fourth side 514 toward the third side 512 along the longitudinal direction 124. A fourth corner point 516d can be disposed at the location defined at the intersection of 10% of the width of the cropped region 506 measured from the first side 508 toward the second side 510 along the lateral direction 122, and 10% of the length of the cropped region 506 measured from the fourth side 514 toward the third side 512 along the longitudinal direction 124. In some cases, the system 102 can determine the points 516a-d, and then can generate the boundary 506 by connecting the first point 516a with the second point 516b and the fourth point 516d, and by connecting the third point 516c with the second point 516b and the fourth point 516d, so as define the rectangular boundary 506. In doing so, the system 502 can generate subregions 518 of the cropped region 502 defined between the boundary 506 and the perimeter 504 of the cropped region 502. The subregions 518 can include a first subregion 518a between the first side 508 and the portion of the boundary 506 proximate to the first side 508 along the lateral direction 122, a second subregion 518b between the second side 510 and the portion of the boundary 506 proximate to the second side 510 along the lateral direction 122, a third subregion 518c between the third side 512 and the portion of the boundary 506 proximate to the third side 512 along the longitudinal direction 124, and a fourth subregion 518d between the fourth side 514 and the portion of the boundary 506 proximate to the fourth side 514 along the longitudinal direction 124.

Referring again to FIG. 2, at 214, the system 102 can determine, based on the captured depth image 402, respective pixels associated with maximum heights (or minimum depths) along the transverse direction 120 in the subregions 518. For example, by evaluating the depth pixels from the captured image 402 that correspond to each of the subregions 518a-d, the system 102 can determine a maximum height (minimum depth from the camera 118 along the transverse direction 120) along the transverse direction 120 defined by objects in each of the subregions 518a-d. After the minimum depths (or maximum heights) are determined for each subregion, the system 102 can compare each minimum depth (or maximum height) to the depth (or height) defined by the bottom end 111 along the transverse direction 120, at 216. If the minimum depth at each subregion is substantially equal to the depth defined by the bottom end 111, the system 102 can determine that no objects are disposed within the subregions 518, and thus the process can proceed to 218, where the system 102 can select the default or bin bottom ROI (e.g., cropped region 502) as the adaptive ROI result, such that the default ROI defines the selected or adaptive ROI. The system can then proceed to process the selected ROI at 220, so as to determine grasp points on the objects within the bin. For example, the adaptive ROI can be passed as input into a grasping neural network model that can determine grasp points that have the highest grasp quality within the adaptive ROI. Thus, the adaptive ROI can define the input into a grasping model. The system 102 can convert the grasp points to robot coordinates so that the robot 104 can then grasp the objects at the grasp points that are determined from the selected ROI.

Still referring to FIG. 2, if the minimum depth of one or more of the subregions 518a-d is greater than the depth defined by the bottom end 111, such that at least one subregion defines a height that is greater than the height defined by the bottom end 111 along the transverse direction 120, the system 102 can determine that an object might be disposed within the corresponding one or more subregions, and thus the process can proceed to 222, where the system 102 can expand the default or bin bottom ROI (cropped region 502) so as to define an adjusted or expanded ROI, for instance an example adjusted or expanded ROI 505. In various examples, the points 516a-d can be adjusted so as to define the adjusted ROI 505 that is larger than the default ROI 302. For example, the first point 516a can be adjusted based on the maximum height defined by an object in the first or third subregions 518a and 518c, respectively, defining a height that is greater that the bin bottom end 111. In particular, for example, the first point 516a (e.g., top-left coordinate in FIGS. 3-5B) can be adjusted along the lateral and/or longitudinal directions 122 and 124 such that a new location of the first point 516a is closer to the top end 109 in the captured image, as compared to the original location of the first point 516a. Alternatively, or additionally, the third point 516c can be adjusted based on the maximum height defined by an object in the second or fourth subregions 518b and 518d, respectively, defining a height that is greater that the bin bottom end 111. Thus, for example, the third point 516c (bottom-right coordinate in FIGS. 3-5B) can be adjusted along the lateral and/or longitudinal directions 122 and 124 such that a new location of the third point 516c is closer to the top end 109 of the captured image as compared to the original location of the third point 516c.

In various examples, the distance that the points are adjusted, and thus the amount that the ROI is expanded, is based on the minimum depth in the subregion into which the point is moved, as compared to the sum of the minimum depths in the subregions defined by the given point. In particular, for example, the first point 516a can be moved a distance along the lateral direction 122 (toward the first subregion 518a) proportional to: the minimum depth in the first subregion 518a divided by the sum of the minimum depths in the first and third subregions 518a and 518c, respectively. Similarly, for example, the first point 516a can be moved a distance along the longitudinal direction 124

(toward the third subregion 518a) proportional to: the minimum depth in the third subregion 518c divided by the sum of the minimum depths in the first and third subregions 518a and 518c, respectively.

Thus, with continuing reference to FIG. 5B, the cropped region 502 can be expanded to define the adaptive ROI but expanding the first and third points 516a and 516c, respectively, by respective amounts that are based on the minimum depths (or maximum heights) in the respective subregions defined by the first and third points 516a and 516c. As an example, the coordinates of the first point 516a can be represented as (x1, y1) and the coordinates of the third point 516c can be represented as (x2, y2). The height adjustment value as described above for the first point 516a can be represented as T in millimeters in the 3D camera frame. The system 102 can convert the coordinates (x1, y1) of the first point 516a from the 2D image frame in pixels to the 3D camera frame in millimeters by using the camera intrinsic matrix. By way of example, the 3D camera frame coordinates of the first point 516a can be represented as (a1, b1, c1). The system 102 can add the height adjustment value T to the z-coordinate c1 (transverse direction 120) to expand the cropped region 502 in the height dimension along the transverse direction 120. The system 102 can then convert the new 3D coordinate (a1, b1, c1+T) to the 2D image pixel frame by using the camera intrinsic matrix in a reverse transformation, so as to define a first new point 505a (x1', y1') on the adaptive ROI 505. The first new point 505a can be T mm higher than the first point 516a. The third point 516c can be adjusted in a similar manner so as to generate another new point, for instance a third new point 516c, that is expanded by its corresponding height adjustment value along the transverse direction 120. In an example, the new points 505a and 505c can define the perimeter of the adaptive ROI 505 that also includes second and fourth corner or new points 505b and 505d, respectively. It will be understood that the opposed second and fourth points 505b and 505d can alternatively be expanded to generate the adaptive ROI 505 in accordance with various examples.

Additionally, or alternatively, the coordinates defined by points 516a-d or points 505a-d can based on the perspective of the camera 118, which can depend on the location of the bin center with respect to the image center. For example, in some cases, at least one side of the bin may define more bin wall surface area 404 as compared to the other sides because of the perspective of the camera 118 relative to the bin 107. In such cases, the region 502 can be adjusted to include more of the at least one side of the bin 107 that is more visible (defines more bin wall surface 404) as compared to the other sides of the bin 107. By way of example, if the bin 107 is off centered with respect to the camera 118 along the lateral direction 122 such that the camera 118 is over the bottom end 111 along the transverse direction 120, but closer to the first side 113 than the second side 115 measured along the lateral direction 122 when the image 402 is captured, the system 102 can expand the region 502 to include more of the first side 113 than the second side 115. From the above steps, it would be a corollary that the ROI will always remain a rectangle that is vertically aligned with respect to the bin bottom rectangle.

After the default ROI (or cropped region) is expanded so as to define an expanded ROI, for instance the adaptive ROI 505, the system 102 can determine whether the expanded ROI remains within the boundaries defined by the bin 107, at 224. For example, the top end 109 of the bin 107 can define coordinates in the captured image 402 along the lateral and longitudinal directions 122 and 124, respectively, and the coordinates can define the boundary of the bin 107. The adjusted points 505a-d can be compared to the boundary of the bin to determine whether the boundary of the bin surrounds the adjusted points 505a-d. By way of example, the first point 505a can have coordinates represented as (x1, y1) and the third point 505c can have coordinates represented as (x2, y2). The system 102 can determine the coordinates of the corners defined by the top end 109 as described above relative to the coordinates of the first point 516a and the third point 516b. In particular, for example, the system 102 can determine the coordinates (X1, Y1) of the corner point (e.g., top-left in FIGS. 3-5B) defined by the top end 109 that is proximate to the first new or corner point 505a, and the system 102 can determine the coordinates (X2, Y2) of the corner point (e.g., bottom-right in FIGS. 3-5B) defined by the top end 109 that is proximate to the third new or corner point 505c. Continuing with the example, at 224, the system 102 can determine whether (x1>=X1) and (y1>=Y1) and whether (x2<=X2) and (y2<=Y2). If these conditions are satisfied, the system 102 can determine that the adaptive ROI 505 lies within the outer bin boundary defined by the top end 109. Therefore, at 226 the system select the adaptive ROI 505, and return the adaptive ROI coordinates (x1,y1) and (x2,y2) so that grasp points can be determined within the ROI 505.

Thus, in an example, when adjusted points, for instance the first new point 505a and the third new point 505b opposite the first new point 505c, are within adjacent corner points defined by the top end 109 of the bin 107, the system 102 determines that the expanded ROI is within the boundary defined by the bin, thereby determining that the expanded ROI is valid. The process can then proceed to 226, where the system 102 can select the expanded ROI, for instance the ROI 505, as the adaptive ROI result, such that the expanded ROI can define the selected or adaptive ROI (e.g., the adaptive ROI 505). The system can then proceed to process the selected ROI at 220, so as to determine grasp points on the objects within the bin. Furthermore, at 220, the system 102 can send instructions to the robot 104 so that the robot 104 grasps the objects at the determined grasp points. Alternatively, if the system 102 determines (at 224) that at least one of the new points 505a-d lies outside the boundary defined by the top end 109 of the bin 107, the system 102 can adjust or overwrite the one or more outlying points so that the ROI is contained within the bin boundary defined by the top end 109, at 228. Continuing with the example above, if any of the conditions above are not satisfied, the outlier can be adjusted to be equivalent to the bin corner coordinate proximate to the outlier. In particular, for example: If (x1<X1), then x1=X1; If (y1<Y1), then y1=Y1; If (x2>X2), then x2=X2; or If (y2>Y2), then y2=Y2. Thus, at 228, the system 102 can adjust the outlier and return the new adjusted outlier as the adaptive ROI result that is used to determine grasp points, at 220.

Thus, in various examples, an ROI can be adapted in a single traversal of the depth pixels in the cropped bin region. Without being bound by theory, but by way of example, such a traversal can be performed in about 40 to 50 milliseconds on a Siemens SIMATIC S7-1500 Multifunctional platform CPU (MFP). Furthermore, the operations 200 can be implemented with various cameras and cuboidal-type bins, among others. Further still, the various operations described herein do require any sample data for training as in various machine learning solutions, while still addressing various issues presented by, for example and without limitation, different camera perspectives, bins with various sized objects (e.g., tall and narrow) near or against bin walls. The operations

200 can result in substantially better grasp performance as compared to current approaches, particularly when applied to grasping objects that define a substantial height near or against bin walls, which was not even possible, let alone efficient, in many previous approaches.

Figure 6:
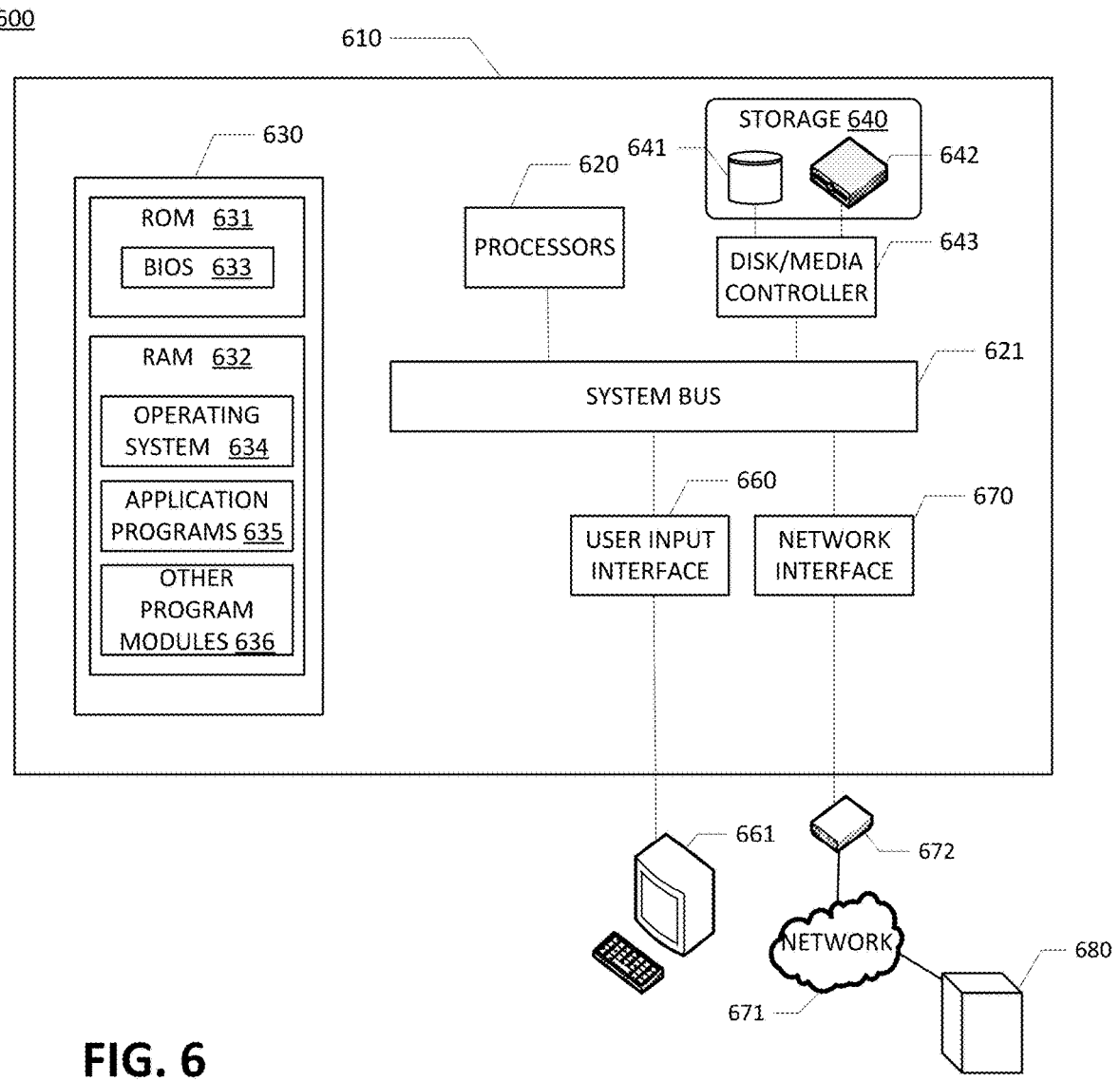
FIG. 6 illustrates a computing environment within which embodiments of the disclosure may be implemented.

FIG. 6 illustrates an example of a computing environment within which embodiments of the present disclosure may be implemented. A computing environment 600 includes a computer system 610 that may include a communication mechanism such as a system bus 621 or other communication mechanism for communicating information within the computer system 610. The computer system 610 further includes one or more processors 620 coupled with the system bus 621 for processing the information. The autonomous system 102, and thus the computing system 200, may include, or be coupled to, the one or more processors 620.

The processors 620 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general-purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 620 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 621 may include at least one of a system bus, a memory bus, an address bus, or a message bus, and may permit exchange of information (e.g., data (including computer-executable code), signaling, etc.) between various components of the computer system 610. The system bus 621 may include, without limitation, a memory bus or a memory controller, a peripheral bus, an accelerated graphics port, and so forth. The system bus 621 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 6, the computer system 610 may also include a system memory 630 coupled to the system bus 621 for storing information and instructions to be executed by processors 620. The system memory 630 may include computer readable storage media in the form of volatile and/or nonvolatile memory, such as read only memory (ROM) 631 and/or random-access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. System memory 630 may additionally include, for example, operating system 634, application programs 635, and other program modules 636. Application programs 635 may also include a user portal for development of the application program, allowing input parameters to be entered and modified as necessary.

The operating system 634 may be loaded into the memory 630 and may provide an interface between other application software executing on the computer system 610 and hardware resources of the computer system 610. More specifically, the operating system 634 may include a set of computer-executable instructions for managing hardware resources of the computer system 610 and for providing common services to other application programs (e.g., managing memory allocation among various application programs). In certain example embodiments, the operating system 634 may control execution of one or more of the program modules depicted as being stored in the data storage 640. The operating system 634 may include any operating system now known or which may be developed in the future including, but not limited to, any server operating system, any mainframe operating system, or any other proprietary or non-proprietary operating system.

The computer system 610 may also include a disk/media controller 643 coupled to the system bus 621 to control one or more storage devices for storing information and instructions, such as a magnetic hard disk 641 and/or a removable media drive 642 (e.g., floppy disk drive, compact disc drive, tape drive, flash drive, and/or solid-state drive). Storage devices 640 may be added to the computer system 610 using an appropriate device interface (e.g., a small computer system interface (SCSI), integrated device electronics (IDE), Universal Serial Bus (USB), or FireWire). Storage devices 641, 642 may be external to the computer system 610.

The computer system 610 may also include a field device interface 665 coupled to the system bus 621 to control a field device 666, such as a device used in a production line. The computer system 610 may include a user input interface or GUI 661, which may comprise one or more input devices, such as a keyboard, touchscreen, tablet and/or a pointing device, for interacting with a computer user and providing information to the processors 620.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium of storage 640, such as the magnetic hard disk 641 or the removable media drive 642. The magnetic hard disk 641 (or solid-state drive) and/or removable media drive 642 may contain one or more data stores and data files used by embodiments of the present disclosure. The data store 640 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 600 may further include the computer system 610 operating in a networked environment using logical connections to one or more remote computers, such as remote computing device 680. The network interface 670 may enable communication, for example, with other remote devices 680 or systems and/or the storage devices 641, 642 via the network 671. Remote computing device 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 680). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

It should be appreciated that the program modules, applications, computer-executable instructions, code, or the like depicted in FIG. 6 as being stored in the system memory 630 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 610, the remote device 680, and/or hosted on other computing device(s) accessible via one or more of the network(s) 671, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth.

It should further be appreciated that the computer system 610 may include alternate and/or additional hardware, software, or firmware components beyond those described or depicted without departing from the scope of the disclosure. More particularly, it should be appreciated that software, firmware, or hardware components depicted as forming part of the computer system 610 are merely illustrative and that some components may not be present or additional components may be provided in various embodiments. While various illustrative program modules have been depicted and described as software modules stored in system memory 630, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An autonomous system configured to operate in an active industrial environment, the autonomous system comprising:

a camera configured to capture a depth image of a bin containing a plurality of objects, so as to define a captured image, the bin defining:

a top end facing the camera and a bottom end opposite the top end along a first direction;

a front end and a rear end opposite the front end along a second direction that is substantially perpendicular to the first direction; and a first side and a second side opposite the first side along a third direction that is substantially perpendicular to both the first and second directions;

one or more processors; and a memory storing instructions that, when executed by the one or more processors, cause the autonomous system to, during operation:

based on the bottom end and the captured image, generate a cropped region that defines a plane along the second and third directions;

based on the captured image, make a determination as to whether at least one object of the plurality of objects lies outside the cropped region; and based on the determination, select a final region of interest for determining grasp points on the plurality of objects.

2. The autonomous system as recited in claim 1, the autonomous system further comprising a robot defining an end effector configured to grasp the plurality of objects within the bin, the memory further storing instructions that, when executed by the one or more processors, further cause the autonomous system to:

based on the final region of interest, determine grasp points on the plurality of objects; and provide the grasp points to the robot so that the robot can grasp the plurality of objects at the respective grasp points.

3. The autonomous system as recited in claim 1, the memory further storing instructions that, when executed by the one or more processors, further cause the autonomous system to:

generate the cropped region based on an area defined by the bottom end in the captured image, such that the cropped region defines a perimeter within the area defined by the bottom end.

4. The autonomous system as recited in claim 3, the memory further storing instructions that, when executed by the one or more processors, further cause the autonomous system to:

based on the perimeter, determine a boundary that is within the perimeter, such that a first and second subregion are defined between the perimeter of the cropped region and the boundary along the second direction, and a third and fourth subregion are defined between the perimeter of the cropped region and the boundary along the longitudinal direction.

5. The autonomous system as recited in claim 4, wherein the bottom end of the bin defines a bin bottom height along the first direction, the memory further storing instructions that, when executed by the one or more processors, further cause the autonomous system to:

based on the captured image, determine a maximum height along the transverse direction defined by the subregions;

compare the maximum height of the subregions to the bin bottom height;

determine that the maximum height of the subregions is substantially equal to the bin bottom height; and responsive to determining that the maximum height of the subregions is substantially equal to the bin bottom height, use the cropped region as the final region of interest, such that the grasp points are determined based on the cropped region.

6. The autonomous system as recited in claim 4, wherein the bottom end of the bin defines a bin bottom height along the first direction, the memory further storing instructions that, when executed by the one or more processors, further cause the autonomous system to:

based on the captured image, determine a maximum height along the transverse direction defined by the subregions;

compare the maximum height of the subregions to the bin bottom height;

determine that the maximum height of the subregions is greater than the bin bottom height; and responsive to determining that the maximum height of the subregions is greater than the bin bottom height, expand the cropped region along the second and third directions, so as to define an expanded region of interest that includes at least a portion of the subregions.

7. The autonomous system as recited in claim 6, wherein the top end of the bin defines a bin boundary along the second and third directions, the memory further storing instructions that, when executed by the one or more processors, further cause the autonomous system to:

determine that the expanded region of interest fits within the bin boundary, such that the expanded region of interest defines an adaptive region of interest; and use the adaptive region of interest as the final region of interest, such that the grasp points are determined within the adaptive region of interest.

8. A method performed by an autonomous system configured determine grasp locations for grasping objects from a bin, the method comprising:

capturing, by a camera of the autonomous system, a depth image of the bin containing a plurality of objects, so as to define a captured image, the bin defining:

a top end facing the camera and a bottom end opposite the top end along a first direction;

a front end and a rear end opposite the front end along a second direction that is substantially perpendicular to the first direction; and a first side and a second side opposite the first side along a third direction that is substantially perpendicular to both the first and second directions;

based on the bottom end and the captured image, generating a cropped region that defines a plane along the second and third directions;

based on the captured image, make a determination as to whether at least one object of the plurality of objects lies outside the cropped region; and based on the determination, selecting a final region of interest for determining grasp points on the plurality of objects.

9. The method as recited in claim 8, the method further comprising:

based on the final region of interest, determining grasp points on the plurality of objects; and instructing a robot to grasp the plurality of objects at the respective grasp points.

10. The method as recited in claim 8, the method further comprising:

generating the cropped region based on an area defined by the bottom end in the captured imaged, such that the cropped region defines a perimeter within the area defined by the bottom end.

11. The method as recited in claim 10, the method further comprising:

based on the perimeter, determining a boundary that is within the perimeter, such that a first and second subregion are defined between the perimeter of the cropped region and the boundary along the second direction, and a third and fourth subregion are defined between the perimeter of the cropped region and the boundary along the longitudinal direction.

12. The method as recited in claim 11, wherein the bottom end of the bin defines a bin bottom height along the first direction, the method further comprising:

based on the captured image, determining a maximum height along the transverse direction defined by the subregions;

comparing the maximum height of the subregions to the bin bottom height;

determining that the maximum height of the subregions is substantially equal to the bin bottom height; and responsive to determining that the maximum height of the subregions is substantially equal to the bin bottom height, using the cropped region as the final region of interest, such that the grasp points are determined based on the cropped region.

13. The method as recited in claim 11, wherein the bottom end of the bin defines a bin bottom height along the first direction, the method further comprising:

based on the captured image, determining a maximum height along the transverse direction defined by the subregions;

comparing the maximum height of the subregions to the bin bottom height;

determining that the maximum height of the subregions is greater than the bin bottom height; and responsive to determining that the maximum height of the subregions is greater than the bin bottom height, expanding the cropped region along the second and third directions, so as to define an expanded region of interest that includes at least a portion of the subregions.

14. The method as recited in claim 13, wherein the top end of the bin defines a bin boundary along the second and third directions, the method further comprising:

determining that the expanded region of interest fits within the bin boundary, such that the expanded region of interest defines an adaptive region of interest; and using the adaptive region of interest as the final region of interest, such that the grasp points are determined within the adaptive region of interest.

15. A non-transitory computer-readable storage medium including instructions that, when processed by a computing system, configure the computing system to perform operations, the operations comprising:

capturing, by a camera, a depth image of a bin containing a plurality of objects, so as to define a captured image, the bin defining:

a top end facing the camera and a bottom end opposite the top end along a first direction;

a front end and a rear end opposite the front end along a second direction that is substantially perpendicular to the first direction; and a first side and a second side opposite the first side along a third direction that is substantially perpendicular to both the first and second directions;

based on the bottom end and the captured image, generating a cropped region that defines a plane along the second and third directions;

based on the captured image, make a determination as to whether at least one object of the plurality of objects lies outside the cropped region; and based on the determination, selecting a final region of interest for determining grasp points on the plurality of objects.

* * * * *